United States Patent
Baumgart et al.

(10) Patent No.: US 6,747,091 B1
(45) Date of Patent: Jun. 8, 2004

(54) POWDER-SLURRY THAT CAN BE HARDENED BY ACTINIC RADIATION OR OPTIONALLY BY THERMAL MEANS, METHOD FOR PRODUCING SAID SLURRY AND USE OF THE SAME

(75) Inventors: Hubert Baumgart, Münster (DE); Ulrike Röckrath, Senden (DE); Astrid Poth, Münster (DE); Günther Ott, Münster (DE); Christin Sobbe, Hamm (DE); Uwe Meisenburg, Duisburg (DE)

(73) Assignee: BASF Coatings AG, Munster (DE)

( * ) Notice: Subject to any disclaimer, the term of this patent is extended or adjusted under 35 U.S.C. 154(b) by 0 days.

(21) Appl. No.: 09/890,520

(22) PCT Filed: Jan. 28, 2000

(86) PCT No.: PCT/EP00/00676
§ 371 (c)(1),
(2), (4) Date: Oct. 26, 2002

(87) PCT Pub. No.: WO00/50518
PCT Pub. Date: Aug. 31, 2000

(30) Foreign Application Priority Data

Feb. 25, 1999 (DE) .......................................... 199 08 013

(51) Int. Cl.[7] ............................................. C08F 220/10
(52) U.S. Cl. ...................... 524/560; 523/223; 523/300; 522/74; 522/86; 522/98; 522/103; 522/104; 427/508; 428/544
(58) Field of Search ................................ 524/523, 501, 524/580, 584, 560; 522/84, 85, 86, 93, 98, 100, 103, 74, 104; 427/508; 428/544; 523/223, 300

(56) References Cited

U.S. PATENT DOCUMENTS

| | | |
|---|---|---|
| 3,781,379 A | 12/1973 | Thedore et al. ............. 260/836 |
| 3,974,303 A | 8/1976 | Iwase et al. .................... 427/27 |
| 4,064,161 A | 12/1977 | Lewis et al. ................. 526/320 |
| 4,071,428 A | 1/1978 | Bosso et al. ................. 204/181 |
| 4,091,048 A | 5/1978 | Labana et al. .............. 260/836 |
| 4,129,488 A | 12/1978 | McGinniss ............. 204/159.19 |
| 4,163,810 A | 8/1979 | McGinniss .................... 427/54 |
| 4,181,642 A | 1/1980 | Holle et al. .................... 260/37 |
| 4,208,313 A | 6/1980 | Lewis et al. ............ 260/29.6 R |
| 4,225,650 A | 9/1980 | Van Brederode et al. ... 428/405 |
| 4,268,542 A | 5/1981 | Sakakibara et al. ......... 427/195 |
| 4,332,711 A | 6/1982 | Kooymans et al. ......... 523/402 |
| 4,444,954 A | 4/1984 | Mels et al. .................. 525/124 |
| 4,482,721 A | 11/1984 | Wegner et al. ............. 548/262 |
| 4,489,135 A | 12/1984 | Drexler et al. ............ 428/423.1 |
| 4,851,460 A | 7/1989 | Stranghöner et al. ....... 523/407 |
| 4,880,867 A | 11/1989 | Gobel et al. ................. 524/507 |
| 4,939,213 A | 7/1990 | Jacobs, III et al. ...... 525/329.9 |
| 4,945,128 A | 7/1990 | Hille et al. .................. 524/591 |
| 5,068,305 A | 11/1991 | Meixner et al. ............... 528/49 |
| 5,075,372 A | 12/1991 | Hille et al. .................. 524/839 |
| 5,084,541 A | 1/1992 | Jacobs, III et al. ............ 528/45 |
| 5,288,865 A | 2/1994 | Gupta ........................ 544/200 |
| 5,334,420 A | 8/1994 | Hartung et al. .......... 427/407.1 |
| 5,342,882 A | 8/1994 | Göbel et al. ................. 524/832 |
| 5,368,944 A | 11/1994 | Hartung et al. .......... 428/423.1 |
| 5,370,190 A | 12/1994 | Bigham ........................ 172/40 |
| 5,416,136 A | 5/1995 | Konzmann et al. ......... 523/414 |
| 5,418,264 A | 5/1995 | Obloh et al. ................. 523/414 |
| 5,425,970 A | 6/1995 | Lahrmann et al. .......... 427/493 |
| 5,475,073 A | 12/1995 | Guo ............................. 526/333 |
| 5,480,493 A | 1/1996 | Harry et al. ..................... 134/4 |
| 5,484,850 A | 1/1996 | Kempter et al. ............. 525/286 |
| 5,512,322 A | 4/1996 | Hille et al. ................ 427/407.1 |
| 5,534,598 A | 7/1996 | Duo ........................... 525/329.2 |
| 5,552,496 A | 9/1996 | Vogt-Birnbrich et al. ... 525/440 |
| 5,558,911 A | 9/1996 | Blum .......................... 427/517 |
| 5,569,705 A | 10/1996 | Vogt-Birnbrich et al. ... 524/591 |
| 5,571,861 A | 11/1996 | Klein et al. .................. 524/591 |
| 5,601,880 A | 2/1997 | Schwarte et al. ......... 427/407.1 |
| 5,623,016 A | 4/1997 | Klein et al. .................. 524/591 |
| 5,639,560 A | 6/1997 | Moens et al. ................ 428/482 |
| 5,654,391 A | 8/1997 | Göbel et al. ................... 528/71 |
| 5,658,617 A | 8/1997 | Göbel et al. .............. 427/372.2 |
| 5,691,425 A | 11/1997 | Klein et al. .................. 525/455 |
| 5,817,733 A | 10/1998 | Rink .............................. 528/71 |
| 5,889,106 A | 3/1999 | Kurek et al. ................. 524/589 |
| 5,965,213 A | 10/1999 | Sacharski et al. ........... 427/475 |
| 5,981,653 A | 11/1999 | Wilmes et al. ............... 524/839 |
| 5,990,192 A | * 11/1999 | Gerlitz et al. ................. 522/93 |
| 6,001,424 A | 12/1999 | Lettmann et al. ......... 427/407.1 |
| 6,001,915 A | 12/1999 | Schwarte et al. ............ 524/457 |
| 6,011,078 A | * 1/2000 | Reich et al. ................... 522/86 |
| 6,133,337 A | 10/2000 | Blum et al. .................. 522/104 |
| 6,159,556 A | 12/2000 | Möller et al. ................ 427/475 |
| 6,177,487 B1 | 1/2001 | Sapper et al. |
| 6,187,384 B1 | 2/2001 | Wilke et al. .............. 427/388.4 |

FOREIGN PATENT DOCUMENTS

| | | | |
|---|---|---|---|
| CA | 2102170 | 5/1907 | ......... C09D/175/14 |
| CA | 2073115 | 1/1993 | ........... C08L/75/14 |
| CA | 2102169 | 5/1997 | ......... C09D/175/14 |
| DE | 203 278 | 10/1907 | |
| DE | 24 36 186 A1 | 3/1975 | .............. C08J/3/00 |

(List continued on next page.)

OTHER PUBLICATIONS

English Language Abstract EPO 297 576 A1.
English Abstract on the front page of the International Publication for WO 99/50359.

(List continued on next page.)

Primary Examiner—David W. Wu
Assistant Examiner—Satya Sastri

(57) ABSTRACT

The invention relates to an intrinsically viscous powder-slurry that can hardened by actinic radiation or optionally by thermal means, which contains solid spherical particles with an average particle size of 0.8 to 20 $\mu$m and a maximum particle size of 30 $\mu$m. The clear powder coating slurry contains 0.05 to 1 meq/g of ion-forming groups and 0.05 to 1 meq/g of neutralizing agents and has a viscosity of (i) 50 to 1000 mPas at a shear rate of 1000 s$^{-1}$, (ii) 150 to 8000 mPas at a shear rate of 10 s$^{-1}$, and (iii) from 180 to 12000 mPas at a shear rate of 1 s$^{-1}$.

30 Claims, No Drawings

FOREIGN PATENT DOCUMENTS

| | | | |
|---|---|---|---|
| DE | 26 47 700 A1 | 4/1977 | ............ C08K/5/14 |
| DE | 27 49 576 B2 | 8/1979 | ......... C08F/220/18 |
| DE | 42 03 278 A1 | 8/1993 | ............. C08F/2/00 |
| DE | 44 13 436 A1 | 1/1995 | ............ B05D/1/06 |
| DE | 43 28 092 A1 | 2/1995 | ......... C09D/175/04 |
| DE | 44 01 544 A1 | 7/1995 | ........... C08G/18/32 |
| DE | 196 13 547 A1 | 11/1996 | ............ C09D/5/46 |
| DE | 196 17 086 A1 | 1/1997 | .............. B01F/3/12 |
| DE | 19618657 A1 * | 1/1997 | ............ C09D/5/46 |
| DE | 196 18 657 A1 | 1/1997 | ............ C09D/5/46 |
| DE | 195 34 361 A1 | 3/1997 | ......... C09D/175/14 |
| DE | 195 40 977 A1 | 5/1997 | ............ C09D/5/46 |
| DE | 196 23 371 A1 | 12/1997 | ........... C08G/18/28 |
| DE | 196 31 269 A1 | 2/1998 | ........... C08G/18/80 |
| EP | 0 004 571 A1 | 3/1979 | ......... C07D/249/08 |
| EP | 0 012 463 A1 | 11/1979 | ............ C09D/5/40 |
| EP | WO80/00447 | 3/1980 | ............. C08J/3/02 |
| EP | 0 0 33 896 A1 | 1/1981 | ............. C03C/1/68 |
| EP | 0 089 497 A2 | 2/1983 | ............ C09D/3/72 |
| EP | 0 098 655 A1 | 6/1983 | ............ C09D/3/66 |
| EP | 0 228 003 A1 | 12/1986 | ............. B05D/7/16 |
| EP | 0 234 361 A1 | 2/1987 | ............ C08G/18/08 |
| EP | 0 234 362 A1 | 2/1987 | ............ C08G/18/08 |
| EP | 0 256 540 A2 | 8/1987 | ............ C09D/3/49 |
| EP | 0 260 447 A2 | 8/1987 | ......... C08F/283/10 |
| EP | 0 286 594 A2 | 3/1988 | ............. G03F/7/16 |
| EP | 0 299 148 A2 | 4/1988 | ............ C08G/18/08 |
| EP | 0 297 576 A1 | 6/1988 | ............ C09D/3/72 |
| EP | 0 299 420 A2 | 7/1988 | ............ C09D/3/58 |
| EP | 0 354 261 A1 | 8/1988 | ............ C08G/18/50 |
| EP | WO90/01041 | 2/1990 | ............ C08G/18/08 |
| EP | 0 394 737 A1 | 4/1990 | ......... C09D/175/06 |
| EP | 0 401 565 A1 | 5/1990 | ............ C09D/5/02 |
| EP | 0 410 242 A2 | 7/1990 | ............ C09D/5/03 |
| EP | 0 424 705 A2 | 10/1990 | ......... C08F/283/00 |
| EP | 0 521 928 B1 | 3/1991 | ......... C08F/299/06 |
| EP | 0 593 454 B1 | 3/1991 | ............. B05D/7/26 |
| EP | WO 91/13923 | 9/1991 | ............ C08G/18/08 |
| EP | 0 522 419 A1 | 6/1992 | ............ C08G/18/67 |
| EP | 0 522 420 A2 | 6/1992 | ............. C08J/3/03 |
| EP | 0 522 648 B1 | 7/1992 | ......... C09D/167/00 |
| EP | 0 523 610 A1 | 7/1992 | ......... C09D/163/00 |
| EP | WO92/15405 | 9/1992 | ............ B05D/5/06 |
| EP | 0 536 712 B1 | 10/1992 | ......... C09D/201/02 |
| EP | 0 582 051 A2 | 5/1993 | ........... G05B/19/04 |
| EP | 0 581 211 B1 | 7/1993 | ........... C08G/18/08 |
| EP | 0 584 818 B1 | 8/1993 | ........... C08G/18/08 |
| EP | 0 585 742 B1 | 8/1993 | ......... C09D/167/06 |
| EP | 0 590 484 A1 | 9/1993 | ........... C08G/18/08 |
| EP | 596 460 | 11/1993 | ......... C09D/201/00 |
| EP | 0 596 460 A2 | 11/1993 | ......... C09D/201/00 |
| EP | 0 596 461 B1 | 11/1993 | ......... C09D/201/00 |
| EP | 0 604 922 A1 | 12/1993 | ......... C08K/5/3492 |
| EP | 0 604 992 A1 | 12/1993 | ............. F01N/3/28 |
| EP | WO93/255596 | 12/1993 | ......... C08F/299/00 |
| EP | 0 612 818 A1 | 2/1994 | ............ C09D/5/44 |
| EP | 0 708 788 B1 | 6/1994 | ........... C08G/18/08 |
| EP | 0 634 431 A1 | 7/1994 | ........... C08G/18/12 |
| EP | 0 636 669 A2 | 7/1994 | ......... C09D/167/06 |
| EP | 0 649 865 B1 | 10/1994 | ........... C08G/18/67 |
| EP | 0 650 978 A1 | 10/1994 | ............ C08F/8/00 |
| EP | 0 650 979 A1 | 10/1994 | ............ C08F/8/00 |
| EP | 0 652 264 A2 | 10/1994 | ............ C09D/5/03 |
| EP | 0 669 356 A1 | 2/1995 | ........... C08G/18/83 |
| EP | 0 678 536 A1 | 4/1995 | ........... C08G/18/08 |
| EP | 0 767 185 A1 | 6/1995 | ......... C08F/212/06 |
| EP | WO95/14721 | 6/1995 | ........... C08F/290/14 |
| EP | 0 844 286 A1 | 12/1997 | ............ C09D/5/03 |
| EP | WO 98/28345 | 7/1998 | ............ C08F/8/00 |
| GB | 1 338 204 | 3/1972 | |
| GB | 22 14 650 B2 | 4/1975 | |
| GB | 2 261 664 A | 5/1993 | ......... C09D/163/00 |
| WO | WO92/17546 | 10/1992 | ........... C08L/75/04 |
| WO | WO97/25361 | 7/1997 | ........... C08G/63/553 |
| WO | WO97/49745 | 12/1997 | ........... C08G/18/08 |
| WO | WO97/49747 | 12/1997 | ........... C08G/18/75 |

OTHER PUBLICATIONS

BASF Patent Application No. PCT/EP94/01956, Filed Jun. 16, 1993, pp. 1–38, entitled Process for the preparation of polyurethane resins and their use and the use of ethoxyethyl propionate for the.
English Language Abstract on the front page of the International Publication for WO 91/13923.
English Abstracts for: DE 42 03 278 A1.
English Language Abstract for DE196 23 371 A1.
English Language Abstract DE 43 28 092 A1.
English Language Abstract EP0 650 979 A1.
English Abstracts for: EP 0 582 051 A2.
English Abstracts for: EP 0 286 594.
English Abstracts for: EP 0 585 742 B1.
English Abstracts for: EP 0 522 648 B1.
English Language Abstract on front page of the International Publication For WO 98/28345.
English Abstract for EP 0 033 896 A1.

* cited by examiner

POWDER-SLURRY THAT CAN BE HARDENED BY ACTINIC RADIATION OR OPTIONALLY BY THERMAL MEANS, METHOD FOR PRODUCING SAID SLURRY AND USE OF THE SAME

The present invention relates to a novel powder slurry curable with actinic radiation and, if desired, thermally. The present invention also relates to a novel process for preparing this powder slurry. The invention relates not least to the use of the novel powder slurry to prepare clearcoat materials and also single-coat and multicoat clearcoat systems for the automotive sector and the industrial sector.

Automobile bodies are nowadays coated preferably using liquid coating materials, i.e., spray paints. These coating materials give rise to numerous environmental problems owing to their solvent content. The same applies to the use of waterborne clearcoat materials, since they always still contain certain amounts of organic solvents.

Thermally curable waterborne clearcoat materials of this kind are known from the German patent DE-A-196 23 371. Directly after application, the conventional waterborne clearcoat materials do not dry to a powder but instead flow out to form a continuous film. They comprise aqueous secondary dispersions and are used in the automotive sector for aqueous multicoat systems or aqueous one-component or two-component clearcoat materials. The aim here is for sedimentation-stable dispersions having an average particle size of from about 10 to about 200 nm. The reason, familiar to the skilled worker from experience, is that the better the stabilization and the lower the size of dispersion particles, the less their tendency toward sedimentation. Reliable application behavior and a reduction in popping tendency, however, necessitate the use of up to 20% by weight of solvents as well.

For this reason, increased efforts have been made in recent years to use powder coating materials for the coating. The results to date, however, have not been satisfactory, owing in particular to the need for increased film thicknesses in order to obtain a uniform appearance.

Further problems of powder coating materials for thermal curing arise from the requirement for blocking resistance on storage, and storability even in summer temperatures. In order to ensure that this requirement is met, the softening point of the coating powders must be high. Because of the high softening point of the coating materials, however, the thermally activated crosslinking reaction begins as early as during the melting of the powders on the substrate, before the film surface has achieved optimum leveling.

To solve this problem, the German patents DE-A-24 36 186 and DE-A-26 47 700, the European patents EP-A-0 098 655, EP-A-0 286 594, EP-A-0 410 242, EP-A-0 522 648, EP-A-0 585 742, EP-A-0 636 669 and EP-A-0 650 979, the international patent application WO 93/25596, and the U.S. Pat. Nos. 4,064,161, 4,129,488, 4,163,810, 4,208,3130 and 5,639,560 propose UV-curable powder coating materials in which it is possible to separate the melting operation from the crosslinking. The UV powder coating materials disclosed to date are all based on substances containing acrylic or vinylic unsaturation, which owing to the high melting temperature required for effective blocking resistance may also undergo thermal polymerization prior to UV irradiation. In order to guarantee blocking resistance, the binders employed for the UV powder coating materials must be absolutely solvent-free polymers, which, however, are highly problematic to obtain owing to their tendency to undergo thermal polymerization.

A problem of UV powder coating materials, however, is that they are only of limited suitability for coating three-dimensional objects, since, with such objects, shadow regions occur in which UV powder coating materials undergo little or no curing. The same applies to UV powder coating materials comprising hiding pigments.

Attempts have been made to solve this problem by means of powder coating materials which are curable thermally and with actinic radiation. A so-called dual-cure powder coating material of this kind is known from the European patent EP-A-0 844 286. It comprises an unsaturated binder and a second resin copolymerizable therewith, and also a photoinitiator and a thermal initiator, and is therefore curable thermally and with actinic radiation. However, this dual-cure powder coating material is used as a pigmented topcoat material, which is cured superficially with UV light and thermally in the regions close to the substrate. The aforementioned patent does not reveal whether this known powder coating material is also suitable for producing clearcoats in multicoat systems.

The general problem with the use of powder coating materials, namely that, owing to the different application technology, they cannot be used on existing installations designed for liquid coating materials, is not solved by the dual-cure powder coating material either, however.

This was the reason for the development of thermally curable powder coating materials in the form of aqueous dispersions which can be processed using liquid coating technologies. These powder clearcoat dispersions, known to those skilled in the art also as powder slurries or powder clearcoat slurries, and their preparation and application are described in the German patents DE 196 13 547, DE 196 17 086, DE 196 18 657, DE 195 40 977 and DE 195 18 392, the European patent EP-A-0 652 264, the international patent application WO 80/00447, and the U.S. Pat. No. 4,268,542.

Thus, in the process known from the U.S. Pat. No. 4,268,542, a powder clearcoat slurry based on acrylate resins is used which is suitable for coating automobiles. In this case, a conventional powder coat is applied first of all to the body, after which the powder coating dispersion is applied as a clearcoat material. In this powder clearcoat slurry ionic thickeners are used, which lead to relatively high sensitivity of the applied clearcoat film with respect to moisture, especially with respect to condensation. Moreover, it is necessary to operate at high baking temperatures of more than 160° C.

The powder clearcoat slurry known from the European patent EP-A-0 652 264 is prepared by first coextruding the solid binder and crosslinker components and any additives, as normal with the production of powder coating materials, and then subjecting the coextrudate to dry milling, after which it is converted into a powder clearcoat slurry in a further step of wet milling, using emulsifiers and wetting agents.

Unlike the powder clearcoat materials, these customary and known powder clearcoat slurries may be processed in conventional wet coating installations and may be applied at substantially lower film thickness of approximately 40 μm as against approximately 80 μm in the case of powder coating materials, with good leveling and with a chemical resistance comparable with that of the powder coating materials.

However, the conventional milling processes do not always ensure such a high degree of homogenization of the constituents as would actually be desirable, or else said degree of homogenization must be achieved by means of multiple extrusion, which is laborious.

In the conventional powder clearcoat slurries, relatively large particles are normally unwanted, since they tend toward sedimentation. Moreover, on application and crosslinking of the powder clearcoat slurries there is an increased tendency to form popping marks (blister-shaped cavities enclosed in the coating film).

The situation with cracking, known as mud cracking, in the pulverulent dry films which have been dried initially at room temperature or slightly elevated temperature but not yet baked, is similar. Such drying cracks no longer flow out fully on baking, and in the baked film they form visible flow defects in the form of leather-textured furrows, these drying cracks being more pronounced and more frequent the higher the dry film thickness. In the case of the electrostatic coating of automobile bodies, relatively high film thicknesses may occur locally when there is a higher field line density at sites which are particularly exposed owing to the geometry. Such sites of overcoating are particularly susceptible to mud cracking.

The powder clearcoat slurry known from the German patent DE-A-196 17 086 has an average particle size of the solid particles of from 0.1 to 10 $\mu$m. It is preferred in this case to employ average particle sizes of from 0.23 to 0.43 $\mu$m. For the purpose of stabilization it is necessary, in addition to the ionic stabilization, to employ external emulsifiers as well—generally polyethylene oxide adducts, which reduce the resistance of the coating to water and moisture. Moreover, these known powder clearcoat slurries still always include certain amounts of organic cosolvents or leveling agents, which cannot be removed since they are essential for the flow properties of the part-dried film. Furthermore, their preparation necessitates special equipment such as pressure release homogenizer nozzles. Prior to their application, they are adjusted to the application viscosity with the aid of thickeners; a complex viscosity behavior, however, is not described. Moreover, the patent gives no teaching as to how the problem of mud cracking in powder clearcoat slurries might be solved.

However, the general problem of thermally activated crosslinking on evaporation of the water and coalescence of the resulting powder covering is still not solved with this technology, since crosslinking begins not at a sharply defined temperature but rather gradually, before the water has fully evaporated and an optimum surface has formed. The water which continues to emerge after the crosslinking reaction has begun, owing to the high temperatures required, is a cause of blisters and craters, furthermore.

It is an object of the present invention to provide a novel powder clearcoat slurry which no longer has the disadvantages of the prior art. In particular, the novel powder clearcoat slurry should be able to be prepared with a smaller number of processing steps than the conventional powder clearcoat slurries; at the same time, however, owing to its typical powder slurry properties and its comparable particle sizes, it should have an application behavior whose advantages are similar to said conventional slurries. In contrast to the known waterborne clearcoat materials, the novel powder clearcoat slurries should ensure more reliable application behavior with respect to popping at the required film thicknesses of approximately 40–50 $\mu$m even without the assistance of organic solvents. Moreover, the novel powder clearcoat slurries should be curable with actinic radiation. Furthermore, they should open up the possibility of combining the advantages of curing with actinic radiation with those of thermal curing, without having the specific disadvantages of the two methods.

It is another object of the present invention to find a novel process for preparing powder slurries that continues to ensure the essential advantage of the mixing of the constituents in solution, namely the very good homogeneity of the resultant particles.

Accordingly, the invention provides the novel, pseudoplastic powder slurry curable with actinic radiation and, if desired, thermally, comprising solid spherical particles with an average size of from 0.8 to 20 $\mu$m and a maximum size of 30 $\mu$m, and having an ion-forming group content of from 0.05 to 1 meq/g, a neutralizing agent content of from 0.05 to 1 meq/g, and a viscosity of (i) from 50 to 1000 mPas at a shear rate of 1000 s$^{-1}$, (ii) from 150 to 8000 mPas at a shear rate of 10 s$^{-1}$, and (iii) from 180 to 12000 mPas at a shear rate of 1 s$^{-1}$.

In the text below, the novel pseudoplastic powder slurry curable with actinic radiation and, if desired, thermally is referred to for the sake of brevity as the "slurry of the invention".

Furthermore, the invention provides the novel process for preparing a pseudoplastic powder slurry curable with actinic radiation and, if desired, thermally by 1) emulsification of an organic solution comprising
   1.1) constituents curable with actinic radiation and, if desired,
   1.2) constituents curable thermally, to give an emulsion of the oil-in-water type,
2) removal of the organic solvent or the organic solvents, and
3) partial or complete replacement of the removed solvent volume by water, to give a powder clearcoat slurry comprising solid spherical particles, wherein the powder slurry is further admixed with 4) at least one ionic, especially anionic, thickener and at least one nonionic associative thickener.

In the text below, the novel process for preparing a pseudoplastic powder slurry curable with actinic radiation and, if desired, thermally is referred to for the sake of brevity as the "process of the invention".

The technical advantages of the slurry of the invention result from its ability to be cured with actinic radiation. Additionally, they lie in the ability to combine the known advantages of the thermally curable powder clearcoat slurries—especially that of spray application—with those of UV powder coating materials—especially the separation of the melting process from the crosslinking. It has surprisingly been found that, if the coalesced film has a low residual water content, UV curing is particularly rapid and complete. The natural equilibrium between the water content of the film and the ambient air, which is dependent on the hydrophilicity of the crosslinking paint films, is established rapidly even while the system is still cooling. More surprisingly still, the slurry of the invention is stable even without external emulsifiers and organic solvents.

The slurry of the invention is curable with actinic radiation. In the context of the present invention, actinic radiation means electron beams or UV radiation, especially UV radiation.

For the slurry of the invention it is essential that the average size of the solid particles is from 0.8 to 20 $\mu$m, with particular preference from 1 to 15 $\mu$m, and in particular from 2 to 10 $\mu$m. By average particle size is meant the 50% median value as determined by the laser diffraction method, i.e., 50% of the particles have a diameter$\leq$the median and 50% of the particles have a diameter$\geq$the median.

Slurries having such average particle sizes exhibit better application behavior and, at the applied film thickness of >30 $\mu$m as currently practiced in the automobile industry for the finishing of automobiles, exhibit a greatly reduced tendency toward popping marks and toward mud cracking than do conventional powder clearcoat slurries.

The particle size reaches its upper limit when the particles owing to their size are no longer able to flow out completely on baking, as a result of which film leveling is adversely affected. Where the appearance requirements are not so great, however, it may also be higher. An upper limit of 30 µm is considered sensible, since above this particle size blockage of the spray nozzles of the highly sensitive application apparatus may be expected.

The slurry of the invention may be substantially free from organic solvents. In the context of the present invention this means that it may have a residual volatile solvent content of <1% by weight, preferably <0.5% by weight, and with particular preference <0.2% by weight. It is of very particular advantage in this context for the residual content to be below the analytical detection limit, especially below the gas-chromatographic detection limit.

Similarly, the slurry of the invention may be substantially free—in the abovementioned sense—from external emulsifiers. The above-described particle sizes for use in accordance with the invention may therefore be obtained even without the assistance of additional external emulsifiers.

In accordance with the invention, the constituents curable with actinic radiation and also, if appropriate, the constituents curable thermally have an overall ion-forming group content corresponding to an average acid number or amine number of from 3 to 56 g KOH/g solids (MEQ acid or MEQ amine of from 0.05 to 1.0 meq/g solids), preferably up to 28 (MEQ acid or MEQ amine: 0.5) and in particular up to 17 (MEQ acid or MEQ amine: 0.3).

In accordance with the invention it is of advantage if the ion-forming groups are in the binders. It is of very particular advantage in accordance with the invention in this context if these groups are present in the thermally curable binders, when the powder slurries of the invention in question are curable with actinic radiation and thermally.

In accordance with the invention, the target level of such groups is generally low, since free groups of this kind may remain in the cured coating material and may reduce its resistance toward environmental substances and chemicals. On the other hand, the level of such groups must still be sufficient to ensure the desired stabilization.

Using neutralizing agents, the ion-forming groups are 100% or else only <100% (partially) neutralized. The amount of the neutralizing agent is chosen such that the MEQ value of the slurry of the invention is below 1, preferably below 0.5, and in particular below 0.3 meq/g solids. It is of advantage in accordance with the invention if the amount of the neutralizing agent corresponds at least to an MEQ value of 0.05 meq/g solids.

The chemical nature of the binders curable with actinic radiation and also of the thermally curable binders, where used, is therefore generally not restrictive, provided they contain ion-forming groups which are convertible into salt groups by neutralization and are thereby able to take over ionic stabilization of the particles in water.

Suitable anion-forming groups include acid groups such as carboxylic acid, sulfonic acid or phosphonic acid groups. Accordingly, the neutralizing agents used comprise bases, such as alkali metal hydroxides, ammonia or amines. Alkali metal hydroxides can be used only to a limited extent, since on baking the alkali metal ions are not volatile and, owing to their incompatibility with organic substances, they may cloud the film and cause losses of gloss. Consequently, ammonia or amines are preferred. In the case of amines, water-soluble tertiary amines are preferred. By way of example, mention may be made of N,N-dimethylethanolamine or aminomethylpropanolamine (AMP).

Suitable cation-forming groups include primary, secondary or tertiary amines. Accordingly, the neutralizing agents used comprise, in particular, low molecular mass organic acids such as formic acid, acetic acid or lactic acid.

Binders containing cation-forming groups are known from the field of the electrodeposition coating materials. By way of example, reference may be made to the patents EP-A-0 012 463, EP-A-0 612 818, and U.S. Pat. No. 4,071,428.

For the preferred use of the slurry of the invention in automotive topcoating as unpigmented clearcoat materials, polymers or oligomers containing acid groups as ion-forming groups are preferred, since these so-called anionic binders are generally more resistant to yellowing than the class of the cationic binders.

Nevertheless, cationic binders containing groups convertible into cations, such as amino groups, may likewise be used in principle, provided the field of use tolerates their typical secondary properties such as their tendency toward yellowing.

As binders containing anion-forming groups it is possible to use any desired resins containing the aforementioned acid groups. It is essential, however, that they additionally bear further groups which ensure crosslinkability.

In the case of the binders curable with actinic radiation, preference is given in accordance with the invention to ethylenically unsaturated groups. In the case of the thermally curable binders that may be used as well, hydroxyl groups are of advantage.

Suitable oligomers and polymers of this kind used in accordance with the invention include preferably linear and/or branched and/or block, comb and/or random poly (meth)acrylates, polyesters, alkyds, polyurethanes, acrylated polyurethanes, acrylated polyesters, polylactones, polycarbonates, polyethers, (meth)acryl-atediols or polyureas.

Besides the ethylenically unsaturated groups and also, if desired, the hydroxyl groups, the oligomers and polymers may contain other functional groups as well, such as ether, amide, imide and/or thio groups, provided they do not disrupt the crosslinking reactions.

These oligomers and polymers are known to the skilled worker and numerous suitable compounds are available on the market.

In accordance with the invention, the slurry of the invention comprises constituents which are curable with actinic radiation, especially UV radiation. Suitable binders are all those radiation-curable, low molecular mass, oligomeric and/or polymeric compounds, preferably radiation-curable binders, that are known from the UV coatings field, especially those based on ethylenically unsaturated prepolymers and/or ethylenically unsaturated oligomers, reactive diluents if desired, and also one or more photoinitiators, if desired. Examples of suitable radiation-curable binders are (meth) acryloyl-functional (meth)acrylic copolymers, polyether acrylates, polyester acrylates, unsaturated polyesters, epoxy acrylates, urethane acrylates, amino acrylates, melamine acrylates, silicone acrylates, and the corresponding methacrylates. It is preferred to use binders which are free from aromatic structural units.

It is important that they do not lower the glass transition temperature $T_g$ of the particles of the slurry of the invention to such an extent that there is a risk of its coalescing.

Particular suitability is possessed by acrylate resins containing pendant functional groups, such as epoxide groups or hydroxyl groups, for example, having molecular weights in the range from Mn 1000 to 10000 with molecular weight distributions <4, as described, for example, in DE-A-42 03 278, which are subsequently reacted with acrylic acid or acrylic acid derivatives, such as acryloyl chloride, to give the corresponding acrylated acrylates (EP-A-0 650 979).

Suitable epoxy-functional precursors for the acrylated acrylates curable with actinic radiation are, for example, polyacrylate resins containing epoxide groups, which are preparable by copolymerizing at least one ethylenically unsaturated monomer which contains at least one epoxide group in the molecule with at least one further ethylenically unsaturated monomer which contains no epoxide group in the molecule, at least one of the monomers being an ester of acrylic acid or methacrylic acid. Polyacrylate resins of this kind, containing epoxide groups, are known, for example, from the patents EP-A-299 420, DE-B-22 14 650, DE-B-27 49 576, U.S. Pat. Nos. 4,091,048, and 3,781,379.

Examples of ethylenically unsaturated monomers which contain no epoxide group in the molecule are alkyl esters of acrylic and methacrylic acid containing 1 to 20 carbon atoms in the alkyl radical, especially methyl acrylate, methyl methacrylate, ethyl acrylate, ethyl methacrylate, butyl acrylate, butyl methacrylate, 2-ethylhexyl acrylate and 2-ethyhexyl methacrylate. Further examples of ethylenically unsaturated monomers which contain no epoxide groups in the molecule are acid amides, such as acrylamide and methacrylamide, for example, maleamide, vinylaromatic compounds, such as styrene, methylstyrene and vinyltoluene, nitriles, such as acrylonitrile and methacrylonitrile, vinyl and vinylidene halides, such as vinyl chloride and vinylidene fluoride, vinyl esters, such as vinyl acetate, for example, and hydroxyl-containing monomers, such as hydroxyethyl acrylate and hydroxyethyl methacrylate, for example.

The epoxy-functional monomers used in the epoxy-functional binders are preferably glycidyl acrylate, glycidyl methacrylate, allyl esters and allyl glycidyl ether.

The epoxy-containing polyacrylate resin usually has an epoxide equivalent weight of from 400 to 2500, preferably from 420 to 700, a number average molecular weight (determined by gel permeation chromatography using a polystyrene standard) of from 2000 to 20000, preferably from 1000 to 10000, and a glass transition temperature Tg of from 20 to 100, preferably from 30 to 90, with particular preference from 40 to 80 and especially from 50 to 70° C. (measured by means of differential scanning calorimetry (DSC)). Very particular preference is given to approximately 50° C. The polydispersity of the molecular weight distribution is preferably below 6, with particular preference below 3. Examples of suitable acrylate resins are those described in the German patent DE-A-42 03 278. Mixtures of two or more acrylate resins may also be employed.

The epoxy-containing polyacrylate resin may be prepared by addition polymerization in accordance with methods which are well and widely known.

In addition, the functional resins may also comprise aromatic compounds. Their proportion should be below 60%, preferably below 50%. These compounds may, for example, comprise vinylaromatic compounds. One example thereof is styrene.

It is possible, furthermore, to use the following:
Unsaturated polymers of a wide variety of types, containing from 0.5 to 3.5 double bonds for a molecular weight of 1000 daltons, which are obtained by polymer-analogous reaction of polymers with unsaturated substances (DE-A-24 36 186).

Polymethacrylates having a low molecular weight of from 500 to 25 000 daltons and a narrow distribution, obtained by anionic polymerization and functionalized by polymer-analogous reaction with double bonds (U.S. Pat. No. 4,064,161).

Blends of solid epoxy acrylates, as obtainable by reacting diepoxy resins with acrylic acid, and partially crystalline solid polyester acrylates, as obtainable from carboxyl-terminated polyester by reaction with glycidyl acrylates (U.S. Pat. No. 4,129,488).

Unsaturated polyurethane acrylates with a melting range from 50 to 180° C. (EP-A-0 410 242).

Blends of unsaturated polyurethane acrylates with unsaturated crystalline polyesters, for improving the blocking resistance (EP-A-0 585 742).

Blends of unsaturated polyesters or polyacrylates with polyurethane vinyl ethers (EP-A-0 636 669).

Functional polyacrylates of olefinically unsaturated monomers, by reaction of functionally complementary polyacrylates (EP-A-0 650 978).

An embodiment of EP-A-0 650 978, the base polymers being prepared in a high-temperature polymerization.

Polyacrylates free of double bonds, which can be crosslinked by way of hydrogen transfer to photochemically excited, copolymeric photoinitiators of the Norrish II type (DE-A-44 13 436).

Polyacrylates free of double bonds and containing dihydrodicyclopentadienol acrylate, which can be crosslinked by way of hydrogen transfer to photochemically excited, copolymeric photoinitiators of the Norrish II type (DE-A-e196 00 147).

Further suitable examples of constitutes curable with actinic radiation are disclosed in international patent applications
PCT/EP96/05769:
Crosslinked polymeric compounds containing at least one ethylenic double bond, in a mixture with organic compounds containing at least one hydrogen atom having a bond energy of max. 397 Kg/mol; or
PCT/EP97/07074:
Radiation-crosslinkable acrylic polymers preparable by polymer analogous of polyacrylates with substances introducing a group which forms free radicals with actinic radiation.

The slurry of the invention comprises at least one of the constituents described above.

The photoinitiators required for UV crosslinking are generally already present in the binders described above and are in general selected from the compounds known from the prior art. Use is made in particular of photoinitiators of the Norrish II type. Photoinitiators of this kind are customary and known. Their mechanism of action is based on an intramolecular variant of the hydrogen abstraction reactions as occur diversely in the case of photochemical reactions. By way of example, reference may be made here to Römpp Chemie Lexikon, 9th, expanded and revised edition, Georg Thieme Verlag, Stuttgart, Vol. 4, 1991. One example of a suitable photoinitiator of this kind is 4-hydroxybenzophenone.

According to DE-A-44 13 436 and DE-A-196 00 147, polymers are UV-curable without added photoinitiators. Particularly well-crosslinked films are obtained using mixtures of unsaturated polymers and polymers according to DE-A-44 13 436 and DE-A-196 00 147 with a particularly high fraction of photochemically excitable, copolymeric photoinitiators of the Norrish II type.

In accordance with the invention it is of advantage if the above-described constituents are present predominantly or exclusively in the solid particles.

In the case of the thermally curable binders that may be used, the polyacrylates, the polyesters, the alkyd resins, the polyurethanes and/or the acrylated polyurethanes are of advantage in accordance with the invention and are therefore used with preference.

Examples of suitably thermally curable polyacrylates are described in the European patent application EP-A-0 767 185 and in the American patents U.S. Pat. Nos. 5,480,493, 5,475,073, and 5,534,598. Further examples of particularly preferred polyacrylates are sold under the brand name Joncryl$^R$, such as, for instance, Joncryl$^R$ SCX 912 and 922.5. The preparation of these polyacrylates is common knowledge and is described, for example, in the standard work Houben-Weyl, Methoden der organischen Chemie, 4th edition, volume 14/1, pages 24 to 255, 1961.

The preparation of the thermally curable polyesters and alkyd resins which are preferably used as well is common knowledge and is described, for example, in the standard work Ullmanns Encyklopädie der technischen Chemie, 3rd edition, volume 14, Urban & Schwarzenberg, Munich, Berlin, 1963, pages 80 to 89 and pages 99 to 105, and also in the following books: "Résines Alkydes-Polyesters" by J. Bourry, Dunod, Paris, 1952, "Alkyd Resins" by C. R. Martens, Reinhold Publishing Corporation, New York, 1961, and also "Alkyd Resin Technology" by T. C. Patton, Interscience Publishers, 1962.

The thermally curable polyurethanes and/or acrylated polyurethanes whose use is particularly preferred are described, for example, in the patents EP-A-0 708 788, DE-A-44 01 544, DE-A-195 34 361, EP-A-0 089 497, EP-A-0 256 540, EP-A-0 260 447, EP-A-0 297 576, WO 96/12747, EP-A-0 523 610, EP-A-0 228 003, EP-A-0 397 806, EP-A-0 574 417, EP-A-0 531 510, EP-A-0 581 211, EP-A-0 708 788, EP-A-0 593 454, DE-A-43 28 092, EP-A-0 299 148, EP-A-0 394 737, EP-A-0 590 484, EP-A-0 234 362, EP-A-0 234 361, EP-A-0 543 817, WO 95/14721, EP-A-0 521 928, EP-A-0 522 420, EP-A-0 522 419, EP-A-0 649 865, EP-A-0 536 712, EP-A-0 596 460, EP-A-0 596 461, EP-A-0 584 818, EP-A-0 669 356, EP-A-0 634 431, EP-A-0 678 536, EP-A-0 354 261, EP-A-0 424 705, WO 97/49745, and EP-A-0 401 565.

Suitable crosslinking agents for the thermal cure are all crosslinking agents that are customary in the field of light-stable topcoat materials. Examples thereof are etherified melamine-formaldehyde resins, benzoguanamine resins, compounds or resins containing anhydride groups, compounds or resins containing epoxide groups, blocked and/or unblocked polyisocyanates, beta-hydroxy-alkylamides such as N,N,N',N'-tetrakis(2-hydroxyethyl)-adipamide or N,N,N',N'-tetrakis(2-hydroxypropyl)-adipamide, with compounds containing on average at least two groups capable of transesterification, examples being reaction products of malonic diester and polyisocyanates or of esters and partial esters of polyhydric alcohols of malonic acid with monoisocyanates, as described [lacuna] the European patent EP-A-0 596 460, and/or tris(alkoxycarbonylamino)-triazines, as described in the patents U.S. Pat. Nos. 4,939, 213, 5,084,541, 5,288,865, and EP-A-0 604 922.

Of these, the blocked polyisocyanates are advantageous and are therefore used with particular preference. Examples of suitable blocked polyisocyanates are described in the German patents DE-A-196 17 086 and 196 13 269, in the European patents EP-A-0 004 571 and 0 582 051, and in the U.S. Pat. No. 4,444,954.

The slurry of the invention comprises nonionic and ionic thickeners. By this means, the tendency of the comparatively large solid particles toward sedimentation is effectively countered.

Examples of nonionic thickeners are hydroxyethyl-cellulose and polyvinyl alcohols. So-called nonionic associative thickeners are likewise available on the market in a diverse selection. They consist in general of water-dilutable polyurethanes which are reaction products of water-soluble polyetherdiols, aliphatic diisocyanates and monofunctional hydroxyl compounds with an organophilic radical.

One particularly preferred embodiment relates to nonionic associative thickeners which are able to react photochemically with themselves and/or with the other constituents curable with actinic radiation, thereby achieving a further improvement in the properties of the coating. Nonionic associative thickeners curable with actinic radiation may be obtained by incorporating double bonds or groups containing readily abstractable hydrogen atoms, such as dicyclopentadienyl groups and/or photoinitiator groups of the Norrish II type, especially benzophenone groups. Likewise available commercially are ionic thickeners. These thickeners normally contain anionic groups and are based in particular on specific polyacrylate resins with acid groups, some or all of which may have been neutralized.

Examples of suitable thickeners for inventive use are known from the textbook "Lackadditive" by Johan Bielemann, Wiley-VCH, Weinheim, N.Y., 1998, pages 31 to 65, and so need no further description.

For the slurry of the invention it is essential that both of the above-described thickener types are present therein. It is of advantage in accordance with the invention in this case if the thickeners are present predominantly or exclusively in the aqueous phase.

The amount of the thickeners to be added, and the ratio of ionic to nonionic thickener, is guided by the desired viscosity of the slurry of the invention, which in turn is predetermined by the required sedimentation stability and the specific demands of spray application. The skilled worker is therefore able to determine the amount of the thickeners and the ratio of the thickener types with respect to one another on the basis of simple considerations, possibly with the assistance of preliminary tests.

In accordance with the invention, the viscosity range set is from 50 to 1500 mPas at a shear rate of $1000 \text{ s}^{-1}$ and from 150 to 8000 mPas at a shear rate of $10 \text{ s}^{-1}$, and also from 180 to 12000 mPas at a shear rate of $1 \text{ s}^{-1}$.

This viscosity behavior, known as "pseudoplasticity", describes a state which does justice both to the requirements of spray application, on the one hand, and to the requirements in terms of storage stability and sedimentation stability, on the other: in the state of motion, such as when pumping the slurry of the invention in circulation in the ring circuit of the coating plant and when spraying, for example, the slurry of the invention adopts a state of low viscosity which ensures easy processability. Without shear stress, on the other hand, the viscosity rises and thus ensures that the coating material already present on the substrate to be coated has a reduced tendency to form runs on vertical surfaces. In the same way, a result of the higher viscosity in the stationary state, such as during storage, for instance, is that sedimentation of the solid particles is very largely prevented, or that any slight degree of settling of the powder slurry of the invention during the storage period may be removed again by agitation.

In addition to the essential constituents described above, the solid particles of the slurry of the invention may include additives as are commonly used in clearcoat materials. In this context it is essential that these additives do not substantially lower the glass transition temperature Tg of the binders.

Examples of suitable additives are crosslinking catalysts, emulsifiers, defoamers, adhesion promoters, additives for improving the substrate wetting, additives for improving the surface smoothness, flatting agents, nanoparticles, light stabilizers, corrosion inhibitors, biocides, flame retardants or polymerization inhibitors, as described in detail in the book "Lackadditive" [Additives for coatings] by Johan Bielemann, Wiley-VCH, Weinheim, N.Y., 1998.

Thermally curable reactive diluents, reactive diluents curable with actinic radiation, or flow improvers which can be incorporated by crosslinking in the film may be added to the slurry of the invention. It is important, however, that these constituents are located preferentially in the external aqueous phase of the slurry of the invention and not in the disperse organic phase, where they would lower the glass transition temperature Tg and would thus bring about coalescence or coagulation of any settled particles.

Examples of suitable compounds of this kind are oligomeric polyols which are obtainable by hydroformylation and subsequent hydrogenation from oligomeric intermediates obtained by metathesis reactions of acyclic monoolefins and cyclic monoolefins; examples of suitable cyclic monoolefins are cyclobutene, cyclopentene, cyclohexene, cyclooctene, cycloheptene, norbornene or 7-oxanorbornene; examples of suitable acyclic monoolefins are present in hydrocarbon mixtures which are obtained in petroleum processing by cracking ($C_5$ cut); examples of suitable oligomeric polyols for use in accordance with the invention have a hydroxyl number (OHN) of from 200 to 450, a number average molecular weight Mn of from 400 to 1000, and a mass average molecular weight $M_w$ from 600 to 1100;

Further examples of suitable compounds of this kind are branched, cyclic and/or acyclic $C_9$–$C_{16}$ alkanes functionalized with at least two hydroxyl groups, especially diethyloctanediols, and also cyclohexanedimethanol, neopentyl glycol hydroxy-pivalate, neopentyl glycol, trimethylolpropane or pentaerythritol.

Suitable radiation-curable reactive diluents include low molecular mass polyfunctional ethylenically unsaturated compounds. Examples of suitable compounds of this kind are esters of acrylic acid with polyols, such as neopentyl glycol diacrylate, trimethylolpropane triacrylate, pentaerythritol triacrylate or pentaerythritol tetraacrylate; or reaction products of hydroxyalkyl acrylates with polyisocyanates, especially aliphatic polyisocyanates.

The reactive diluents may be present in the aqueous phase and/or in the solid particles of the slurry of the invention.

Where the slurry of the invention is curable thermally and with actinic radiation, the ratio of thermally crosslinkable constituents to constituents crosslinkable with actinic radiation may vary widely. It is guided primarily by whether the slurry of the invention is intended to be curable primarily thermally or primarily with actinic radiation, and also by the intended use of the slurry of the invention. For instance, a slurry of the invention which is curable primarily with actinic radiation will be prepared if the intention is to coat substrates whose capacity to withstand thermal stress is low. In general, the ratio of constituents curable with actinic radiation to constituents curable thermally may be from 20:1 to 1:20, preferably from 10:1 to 1:10, with particular preference from 5:1 to 1:5, and in particular from 3:1 to 1:3. In each individual case, therefore, the skilled worker is able to determine the appropriate ratio on the basis of his or her knowledge in the art, possibly with the assistance of simple preliminary tests.

Per se, the slurry of the invention may be prepared in any desired manner. In accordance with the invention, however, it is of advantage to prepare it by means of the process of the invention.

In the process of the invention, the ionically stabilizable binders and the crosslinking agents and also, where appropriate, the additives and reactive diluents are mixed in organic solution and together with the aid of neutralizing agents are dispersed in water by the secondary dispersion technique. First of all a water-in-oil emulsion is formed, which on further dilution changes into an oil-in-water emulsion. This point is generally reached at solids contents of <50% by weight, based on the emulsion, and is evident externally from a very sharp drop in the viscosity in the course of dilution.

The emulsion thus obtained, still containing solvent, is subsequently freed from solvents by means of azeotropic distillation.

The distillation temperature is guided primarily by the glass transition temperature Tg of the binders. In order to prevent coagulum, i.e., a flowing together of the particles which in accordance with the invention have only a low level of stabilization, to almost separate continuous organic phase, during the distillation, it is essential to keep the distillation temperature below the glass transition temperature Tg. By way of substitution, the glass transition temperature may also be described by way of the minimum film formation temperature of the dispersion. The minimum film formation temperature may be determined by drawing down the dispersion onto a glass plate using a coating bar and heating the draw down in a gradient oven. The temperature at which the pulverulent layer forms a film is referred to as the minimum film formation temperature.

In accordance with the invention it is of advantage if the minimum film formation temperature is more than 20° C., in particular more than 30° C.

In accordance with the invention it is of advantage if the solvents to be removed are distilled off at a distillation temperature below 70° C., preferably below 50° C., and in particular below 40° C. If desired, the distillation pressure in this case is chosen so that this temperature range is maintained in the case of relatively high-boiling solvents.

At its most simple, the azeotropic distillation may be realized by stirring the emulsion in an open vessel at room temperature for several days. In the preferred case, the solvent-containing emulsion is freed from the solvents in a vacuum distillation.

In order to avoid high viscosities, the amount of water and solvents removed by evaporation or distillation is replaced by water. The water may be added before, during or else after the evaporation or the distillation by means of portionwise addition.

After the loss of the solvents, the glass transition temperature Tg of the dispersed particles rises, and instead of the previous solvent-containing emulsion (liquid-in-liquid dispersion) a solid-in-liquid dispersion—the slurry of the invention—is formed.

The slurry of the invention advantageously has a solids content of from 10 to 60% by weight, in particular from 20 to 50% by weight.

To produce the clearcoats of the invention, the slurry of the invention is applied to the substrate that is to be coated. No special measures need be taken here; instead, application may take place in accordance with the customary and known techniques—for example in accordance with the wet-on-wet technique which is employed in automotive OEM finishing—which is a further particular advantage of the slurry of the invention.

Yet another particular advantage of the slurry of the invention lies in the fact that it is suitable for producing not only single-coat clearcoats but also multicoat clearcoat systems. To produce these multicoat clearcoat systems, it may be combined with all customary and known clearcoat materials. The multicoat clearcoat systems in question exhibit very good intercoat adhesion.

Following its application the slurry of the invention dries without problems and shows no filming at the processing temperature, generally at room temperature. In other words, the slurry of the invention applied as a wet film gives off water at room temperature or slightly elevated temperatures without the particles present therein changing their original solid form. The pulverulent solid film allows the residual water to evaporate more readily than does a flowing wet film. Consequently, the risk of blisters of evaporated water ("popping marks") enclosed in the cured film is reduced. Furthermore, the tendency toward mud cracking is extremely small. A surprising finding here is that, the higher the particle sizes of the slurries of the invention, the lower their tendency toward mud cracking.

In the subsequent curing step, the now substantially water-free powder layer is melted and induced to crosslink. In many cases it may be of advantage to offset the flow process from the crosslinking reaction in terms of time, by operating a staged heating program or a so-called heating ramp. The melted layer is then cured by exposure to actinic radiation, especially UV light.

The radiation cure may be followed by a thermal cure in which those regions of the clearcoat film close to the substrate, and/or, in the case of three-dimensional objects, the shadow regions, may be fully cured, especially thermally. In general, the thermal cure is conducted at temperatures between 120 and 160° C. The corresponding baking time lies between 1 and 60 minutes. In this case the particular advantage of the slurry of the invention is in evidence, namely that by way of the ratio of thermally curable constituents to constituents curable with actinic radiation it may be tailored simply and precisely to the thermal load-bearing capacity and/or the three-dimensional form of the substrate that is to be coated. For instance, in the case of a three-dimensional object which has large shadow regions, the focus may be put on thermal curing and the radiation cure may be used only for a first, partial crosslinking. If, on the other hand, the substrate is a planar substrate whose thermal load-bearing capacity is low, radiation curing will be employed principally. Between these two extremes, every gradation is conceivable and also realizable.

The resultant single-coat or multicoat clearcoat has outstanding performance properties. Thus the clearcoat of the invention adheres firmly to all customary and known basecoats or to primed or unprimed substrates such as metal, glass, wood or plastic. It is of high gloss, smooth, scratch-resistant, weathering-resistant, and free from defects. Moreover, owing to its advantageous profile of properties, it is also suitable for applications outside of automotive finishing, particularly for the coating of furniture and for industrial coating, including coil coating and container coating.

EXAMPLES

Preparation Example 1

1. Preparation of the Solution Polyacrylate Resin A 1291.5 parts of methyl ethyl ketone (MEK) and 43.0 parts of mercaptoethanol were charged to a vessel and heated at 80° C. By way of two separate feed vessels, the initiator, consisting of 143.5 parts of TBPEH (tert-butyl perethylhexanoate) and 86.1 parts of MEK, and the monomer mixture, consisting of 470.7 parts of tert-butyl acrylate, 254.0 parts of n-butyl methacrylate, 287 parts of cyclohexyl methacrylate, 409.0 parts of hydroxypropyl methacrylate and 14.3 parts of acrylic acid, were metered into the initial charge over the course of 5 h at 80° C. Thereafter the batch was heated to 85° C. and a portion of the volatile components was stripped off under reduced pressure at from 800 to 500 mbar over the course of 5 h. The batch was then allowed to cool to about 60° C. and the resin solution was discharged.

The resin solution had the following characteristics:

| | |
|---|---|
| Solids: | 69.8% (1 h at 130° C.) |
| Acid number: | 27 mg KOH/g solid resin |

Preparation Example 2

The Preparation of a Blocked Polyisocyanate Crosslinker 837 parts of isophorone diisocyanate were charged to an appropriate reaction vessel and admixed with 0.1 part of dibutyltin dilaurate. Then a solution of 168 parts of trimethylolpropane and 431 parts of methyl ethyl ketone was run in slowly. As a result of the exothermic reaction, the temperature rose. After it had reached 80° C., the temperature was held constant by external cooling and the rate of addition was throttled slightly if required. After the end of the feed, this temperature was maintained for about 1 hour until the isocyanate content of the solids had reached 15.7% (based on NCO groups). The reaction mixture was then cooled to 40° C., and a solution of 362 parts of 3,5-dimethylpyrazole in 155 parts of methyl ethyl ketone was added over the course of 30 minutes. After the reaction mixture had heated up to 80° C. owing to the exothermic reaction, the temperature was kept constant for 30 minutes until the NCO content had fallen to less than 0.1%. Then 47 parts of n-butanol were added to the reaction mixture, its temperature was held at 80° C. for a further 30 minutes, and then after brief cooling it was discharged.

The reaction product had a solids content of 69.3% (1 h at 130° C.).

Preparation Example 3

Preparation of a Crosslinking Agent Curable with Actinic Radiation 1350 parts of Vestanat® T 1890 (trimerized isophorone diisocyanate; Creanova, formerly Chemische Werke Hüls) were charged to a vessel together with 907.2 parts of methyl ethyl ketone (MEK), and 0.22 part of dibutyltin dilaurate and 4.4 parts of hydroquinone were added. Then 864 parts of 4-hydroxybutyl acrylate were run in slowly. As a result of the exothermic reaction, the temperature rose. After the temperature had reached 60° C., it was kept constant by external cooling and the rate of addition was throttled slightly if necessary. After the end of the feed, the reaction mixture was held at this temperature for about 2 hours more until the isocyanate content of the solids had fallen to less than 0.1%. Then 37 parts of n-butanol were added, the temperature was held at 60° C. for a further 30 minutes, and the reaction product, following brief cooling, was discharged. The reaction product had a solids content of 69.5% (1 h at 130° C.) and a viscosity of 5.9 dPas (original viscosity; cone and plate viscometer at 23° C.).

Example 1
The Preparation of the Inventive Powder Clearcoat Slurry 1

375.7 parts of the acrylate resin solution A from preparation example 1, 270.2 parts of the crosslinker solution from preparation example 2, and 636.4 parts of the crosslinking agent from preparation example 3, curable with actinic radiation, were mixed in an open stirring vessel, with stirring, at room temperature for 15 minutes. Then 9.0 parts of Cyagard® 1164 L (UV absorber from Cytec), 9.4 parts of Tinuvin® liquid 123 (sterically hindered amine HALS from Ciba Geigy), 6.7 parts of N,N-dimethylethanolamine, 6.7 parts of dibutyltin dilaurate (DBTL) and 120.0 parts of Darocure® 1173 (photoinitiator from Ciba Specialty Chemicals) and 30.0 parts of Irgacure® 184 (photoinitiator from Ciba Specialty Chemicals) were added and the mixture was stirred at room temperature for a further 2 hours. It was then diluted with 528.8 parts of fully deionized water in small portions. After a waiting period of 15 minutes, a further 650.0 parts of DI water were added. A low-viscosity aqueous emulsion with a theoretical solids content of 37% was formed which was stirred at room temperature for a further 50 hours. The amount of liquid given off by evaporation was replaced to the original level by addition of DI water. This gave a pulverulent clearcoat suspension (slurry) having the following characteristics:

| | |
|---|---|
| Solids (2 h 80° C.): | 36.2% |
| MEQ acid: | 0.05 meq/g solids |
| MEQ base: | 0.08 meq/g solids |
| Solvent content: | <0.05% (by gas chromatography) |
| Particle size: | 6.4 μm (0.50; laser diffraction measuring instrument, from Malvern). |

In order to set the appropriate viscosity profile, 56.5 parts of Acrysol® RM-8W (solvent-free nonionic associative thickener from Rohm & Haas) and 16.2 parts of Viskalex® HV 30 (anionic thickener based on polyacrylate resin, from Allied Colloids) was stirred into 2500 parts of the aforementioned slurry. The clearcoat slurry has the following viscosity profile:

1020 mPas at a shear rate of 10 s$^{-1}$
670 mPas at a shear rate of 100 s$^{-1}$
255 mPas at a shear rate of 1000 s$^{-1}$.

The clearcoat slurry had a minimum film formation temperature of 48° C. After 2 weeks of storage at room temperature a slight sediment was in evidence, which was homogeneously reagitated again within 5 minutes using a laboratory stirrer.

Example 2
The Use of the Inventive Powder Clearcoat Slurry 1 from the Example to Produce Multicoat Paint Systems For the application of the inventive powder clearcoat slurry 1 from example 1, a so-called integrated system was prepared, which is described below for the metallic shade "meteor gray".

Using a cup-type gun, a functional coat (Ecoprime® Meteorgrau [meteor gray], BASF Coatings AG) was applied to steel panels coated cathodically with commercially customary electrocoat material. After flashing off at room temperature for 5 minutes, a meteor gray aqueous metallic basecoat material (Ecostar® Meteorgrau, BASF Coatings AG) was applied in the same way to this coat and was subsequently predried at 80° C. for 10 minutes.

After the panels had been cooled, the powder clearcoat slurry 1 was applied in the same way. Thereafter, the panels were first flashed off for 5 minutes and then predried at 80° C. for 10 minutes. Following predrying, the inventive powder clearcoat slurry 1 was first radiation-cured in a UV tunnel (1200 mJ, Aktiprint Mini 12-1 from Technigraf GmbH, 61279 Graevenwiesbach) and then baked in a forced air oven at 145° C. for 30 minutes.

The inventive coating system had an outstanding appearance and a high level of resistance in the chemical test. No defects in the form of popping marks or mud cracking were discernible at the applied clearcoat thicknesses. The surface of the clearcoat was extremely smooth.

The table below gives an overview of the tests conducted and of the results obtained in those tests.

TABLE

Performance properties of the inventive powder clearcoat slurry

| Properties | | Example |
|---|---|---|
| Clearcoat thickness | | 40–45 μm |
| Glass at 20°[a] | | 85 |
| Micropenetration hardness[b] | | 185 |
| BART acid test[c] | | |
| Chemicals: | 40° C. | 0 |
| | 50° C. | 0.5 |
| | 60° C. | 1 |
| | 70° C. | 7 |
| Etching: | 40° C. | 0 |
| | 50° C. | 0 |
| | 60° C. | 0 |
| | 70° C. | 1 |

[a]Gloss meter from Byk
[b]Fischerscope H100V (Vickers diamond pyramid)
[c]The BART (BASF ACID RESISTANCE TEST) was used to determine the resistance of film surfaces to acids and alkalis (=chemicals) and water drops (=etching) After baking, the coating was exposed to further temperature loads in a gradient oven (30 min at 40° C., 50° C., 60° C. and 70° C.). Beforehand the test substances (15%, 10%, 36% sulfuric acid, 6% sulfurous acid, 10% hydrochloric acid, and 5% sodium hydroxide solution (chemicals) and also fully deionized water (etching); 1, 2, 3 or 4 drops) were applied in a defined manner using a volumetric pipette. Following exposure to the test substances, they were removed under running water and the damage was assessed visually after 24 h in accordance with a defined scale:

| Rating | Appearance |
|---|---|
| 0 | no defect |
| 1 | slight marking |
| 2 | marking/matting/no softening |
| 3 | marking/matting/color change/softening |
| 4 | cracks/incipient through-etching |
| 5 | clearcoat removed |

Each individual mark (spot) was evaluated and the result was recorded as a sum of the ratings for the chemicals and for the etching, in each case for one temperature.

What is claimed is:

1. A pseudoplastic powder slurry comprising solid spherical particles with an average size of from 0.8 to 20 μm and a maximum size of 30 μm, and having an ion-forming group content of from 0.05 to 1 meq/g, a neutralizing agent content of from 0.05 to 1 meq/g, and a viscosity of (i) from 50 to 1000 mPas at a shear rate of 1000 s$^{-1}$, (ii) from 150 to 8000 mPas at a shear rate of 10 s$^{-1}$, and (iii) from 180 to 12000 mPas at a shear rate of 1 s$_{-1}$, wherein the pseudoplastic powder slurry is curable with actinic radiation, and, optionally, also curable thermally.

2. The powder slurry of claim 1, wherein the powder slurry has a solids content of from 10 to 60% by weight.

3. The powder slurry of claim 1, wherein the average size of the solid spherical particles is from 1 to 15 μm.

4. The powder slurry of claim 1 further comprising ionic thickeners and nonionic associative thickeners.

5. The powder slurry of claim 1, wherein the solid spherical particles comprise at least one of polyacrylates, polyesters, alkyd resins, and polyurethanes as thermally curable binders and at least one of (meth)acryloyl-functional (meth)acrylic copolymers, polyester(meth)acrylates, polyester(meth)acrylates, unsaturated polyesters, epoxy (meth)acrylates, urethane(meth)acrylates, amino(meth) acrylates, melamine(meth)acrylates, and silicone(meth) acrylates as binders curable with actinic radiation.

6. The powder slurry of claim 1 further comprising photoinitiators, and optionally crosslinking agents for thermal curing.

7. The powder slurry of claim 1, wherein a film formed from the powder slurry comprises a minimum film formation temperature of more than 20° C.

8. The powder slurry of claim 1, wherein the powder slurry is substantially free from organic solvents and from external emulsifiers.

9. A process for preparing a pseudoplastic powder slurry curable with actinic radiation comprising:
   a. emulsifying an organic solution comprising at least one organic solvent and binders curable with actinic radiation, optionally binders curable thermally, to give an emulsion of the oil-in-water type;
   b. removing the at least one organic solvent;
   c. at least partially replacing the removed organic solvent with water to give a powder slurry comprising solid spherical particles; and
   d. admixing at least one ionic thickener and at least one nonionic thickener with the powder slurry.

10. The process of claim 9, wherein the at least one solvent is water-miscible.

11. The process of claim 9, wherein the binders have a glass transition temperature Tg, and wherein the at least one organic solvent is removed at temperatures less then the glass transition temperature Tg of the binders.

12. The process of claim 9, wherein the solid spherical particles have an average size of from 0.8 to 20 $\mu$m and also a maximum size of 30 $\mu$m.

13. The process of claim 9, wherein the powder slurry has an ion-forming-group content of from 0.05 to 1 meq/g, a neutralizing agent content of from 0.05 to 1.0 meq/g, and a viscosity of (i) from 50 to 1000 mPas at a shear rate of 1000 $s^{-1}$, (ii) from 150 to 8000 mPas at a shear rate of 10 $s^{-1}$, and (iii) from 180 to 12000 mPas at a shear rate of 1 $s^{-1}$.

14. A method of using the powder slurry of claim 1 comprising preparing clearcoat materials for at least one of an automotive OEM finish, an automotive refinish, and an industrial coating from the powder slurry.

15. A clearcoat material comprising the powder slurry of claim 1.

16. The method of claim 14 further comprising applying the clearcoat material to a part to form at least one of an automotive OEM finish, an automotive refinish, and an industrial coating.

17. A shaped part comprising a part coated with at least one coat of the clearcoat material of claim 15.

18. The powder slurry of claim 4, wherein at least one of the ionic thickeners and the nonionic associative thickeners is curable with actinic radiation.

19. The powder slurry of claim 1 further characterized by at least two of:
   a. the powder slurry has a solids content of from 10 to 60% by weight;
   b. the powder slurry further comprises ionic thickeners and nonionic associative thickeners;
   c. the solid spherical particles comprise at least one of polyacrylates, polyesters, alkyd resins, and polyurethanes as thermally curable binders and at least one of (meth)acryloyl-functional (meth)acrylic copolymers, polyether(meth)acrylates, polyester(meth)acrylates, unsaturated polyesters, epoxy(meth)acrylates, urethane (meth)acrylates, amino(meth)acrylates, melamine (meth)acrylates, and silicone(meth)acrylates as binders curable with actinic radiation;
   d. the powder slurry further comprises photoinitiators;
   e. the powder slurry further comprises crosslinking agents for thermal curing;
   f. a film formed from the powder slurry comprises a minimum film formation temperature of more than 20° C.;
   g. the powder slurry is substantially free from organic solvents and from external emulsifiers.

20. The process of claim 9, wherein the powder slurry has a solids content of from 10 to 60% by weight.

21. The process of claim 9, the solid spherical particles comprise at least one of polyacrylates, polyesters, alkyd resins, and polyurethanes as thermally curable binders and at least one of (meth)acryloyl-functional (meth)acrylic copolymers, polyether(meth)acrylates, polyester(meth) acrylates, unsaturated polyesters, epoxy(meth)acrylates, urethane(meth)acrylates, amino(meth)acrylates, melamine (meth)acrylates, and silicone(meth)acrylates as binders curable with actinic radiation.

22. The process of claim 9, the powder slurry further comprises photoinitiators, and optionally crosslinking agents for thermal curing.

23. The process of claim 9, a film formed from the powder slurry comprises a minimum film formation temperature of more than 20° C.

24. The process of claim 9, the powder slurry is substantially free from organic solvents and from external emulsifiers.

25. The process of claim 9 further characterized by at least two of:
   a. the at least one solvent is water-miscible;
   b. the binders have a glass transition temperate Tg, and wherein the at least one organic solvent is removed at temperatures less than the glass transition temperature Tg of the binders;
   c. the solid spherical particles have an average size of from 0.8 to 20 $\mu$m and also a maximum size of 30 $\mu$m;
   d. the powder slurry has an ion-forming-group content of from 0.05 to 1 meq/g;
   e. the powder slurry has a neutralizing agent content of from 0.05 to 1.0 meq/g,
   f. the powder slurry has a viscosity of (i) from 50 to 1000 mPas at a shear rate of 1000 $s^{-1}$, (ii) from 150 to 8000 mPas at a shear rate of 10 $s^{-1}$, and (iii) from 180 to 12000 mPas at a shear rate of 1 $s^{-1}$;
   g. the powder slurry has a solids content of from 10 to 60% by weight;
   h. the solid spherical particles comprise at least one of polyacrylates, polyesters, alkyd resins, and polyurethanes as thermally curable binders and at least one of (meth)acryloyl-functional (meth)acrylic copolymers, polyether(meth)acrylates, polyester(meth)acrylates, unsaturated polyesters, epoxy(meth)acrylates, urethane (meth)acrylates, amino(meth)acrylates, melamine (meth)acrylates, and silicone(meth)acrylates as binders curable with actinic radiation;

i. the powder slurry further comprises photoinitiators;
j. the powder slurry further comprises crosslinking agents for thermal curing;
k. a film formed from the powder slurry comprises a minimum film formation temperature of more than 20° C.; and
l. the powder slurry is substantially free from organic solvents and from external emulsifiers.

26. The clearcoat material of claim 15, wherein the powder slurry is further characterized by at least one of:
   a. the powder slurry has a solids content of from 10 to 60% by weight;
   b. the powder slurry further comprises ionic thickeners and nonionic associative thickeners;
   c. the solid spherical particles comprise at least one of polyacrylates, polyesters, alkyd resins, and polyurethane as thermally curable binders and at least one of (meth)acryloyl-functional (meth)acrylic copolymers, polyether(meth)acrylates, polyester(meth)acrylates, unsaturated polyesters, epoxy(meth)acrylates, urethane (meth)acrylates, amino(meth)acrylates, melamine (meth)acrylates, and silicone(meth)acrylates as binders curable with actinic radiation;
   d. the powder slurry further comprises photoinitiators;
   e. the powder slurry further comprises crosslinking agents for thermal curing;
   f. a film formed from the powder slurry comprises a minimum film formation temperature of more than 20° C.;
   g. the powder slurry is substantially free from organic solvents and from external emulsifiers.

27. The process of claim 9 further comprising preparing a clearcoat material for at least one of an automotive OEM finish, an automotive refinish, and an industrial coating.

28. A clearcoat material prepared by the process of claim 27.

29. The process of claim 27 further comprising applying the clearcoat material to a part to form at least one of an automotive OEM finish, an automotive refinish, and an industrial coating.

30. A part formed by the process of claim 29.

* * * * *